(12) United States Patent
Moeskjaer et al.

(10) Patent No.: US 9,453,607 B2
(45) Date of Patent: Sep. 27, 2016

(54) APPARATUS AND A METHOD FOR CURING A LINER OF A PIPELINE

(71) Applicant: PER AARSLEFF A/S, Abyhoj (DK)

(72) Inventors: Ole Moeskjaer, Viby (DK); Bent S. Rasmussen, Kolding (DK); Peter T. Lystbaek, Odder (DK)

(73) Assignee: PER AARSLEFF A/S, Abyhoj (DK)

( * ) Notice: Subject to any disclaimer, the term of this patent is extended or adjusted under 35 U.S.C. 154(b) by 0 days.

(21) Appl. No.: 14/057,721

(22) Filed: Oct. 18, 2013

(65) Prior Publication Data

US 2014/0044426 A1 Feb. 13, 2014

Related U.S. Application Data

(62) Division of application No. 12/527,846, filed as application No. PCT/DK2008/000073 on Feb. 19, 2008, now Pat. No. 8,561,662.

(30) Foreign Application Priority Data

Feb. 19, 2007 (EP) .................................... 07388008

(51) Int. Cl.
*B32B 41/00* (2006.01)
*F16L 55/18* (2006.01)
(Continued)

(52) U.S. Cl.
CPC ............... *F16L 55/18* (2013.01); *F16L 55/165* (2013.01); *F16L 55/26* (2013.01); *B29C 63/34* (2013.01); *B29C 2035/0833* (2013.01)

(58) Field of Classification Search
CPC ........... B26C 2035/0827; B29C 35/10; F16L 2101/10
USPC ........ 156/64, 272.2, 273.3, 275.5, 350, 378, 156/379, 379.6; 522/8
See application file for complete search history.

(56) References Cited

U.S. PATENT DOCUMENTS 6,371,631 B1 * 4/2002 Reutemann .................. 362/390
6,782,932 B1 8/2004 Reynolds, Jr. et al.
(Continued)

FOREIGN PATENT DOCUMENTS

EP 0551790 7/1993
JP 2008142996 A * 6/2008
(Continued)

OTHER PUBLICATIONS

International Search Report on related PCT application (PCT/DK2008/000073) from International Searching Authority (EPO) dated May 21, 2008.
(Continued)

*Primary Examiner* — Michael N Orlando
*Assistant Examiner* — Joshel Rivera
(74) *Attorney, Agent, or Firm* — Klein, O'Neill & Singh, LLP

(57) ABSTRACT

A system for curing a pipeline liner that includes a resin curable by exposure to radiation includes first and second liner curing apparatuses, each of which includes a housing defining opposite first and second ends, and outer and inner walls defining a passage between the first and second ends; a plurality of LED's on the outer wall and operable to irradiate the radiation; and a plurality of heat dissipating elements on the inner wall. The LED's are connected in thermally-conductive relationship to the heat dissipating elements, whereby heat is dissipated from the heat dissipating elements to cool the LED's when a stream of cooling fluid passes through the passage. In use, the apparatuses, joined end-to-end, are moved within the liner while irradiating radiation from the LED's onto the liner, and the velocity of the apparatuses moving through the liner is adjusted to cause a complete curing of the resin.

6 Claims, 10 Drawing Sheets

(51) Int. Cl.
*F16L 55/165* (2006.01)
*F16L 55/26* (2006.01)
*B29C 63/34* (2006.01)
*B29C 35/08* (2006.01)

(56) References Cited

U.S. PATENT DOCUMENTS

2001/0046652 A1 11/2001 Ostler et al.
2005/0154262 A1 7/2005 Banik et al.
2005/0222295 A1 10/2005 Siegel

FOREIGN PATENT DOCUMENTS

| WO | WO93/15131 | 8/1993 |
| WO | WO95/01860 | 1/1995 |
| WO | WO95/10726 | 4/1995 |

OTHER PUBLICATIONS

Written Opinion on related PCT application (PCT/DK2008/000073) from International Searching Authority (EPO).

* cited by examiner

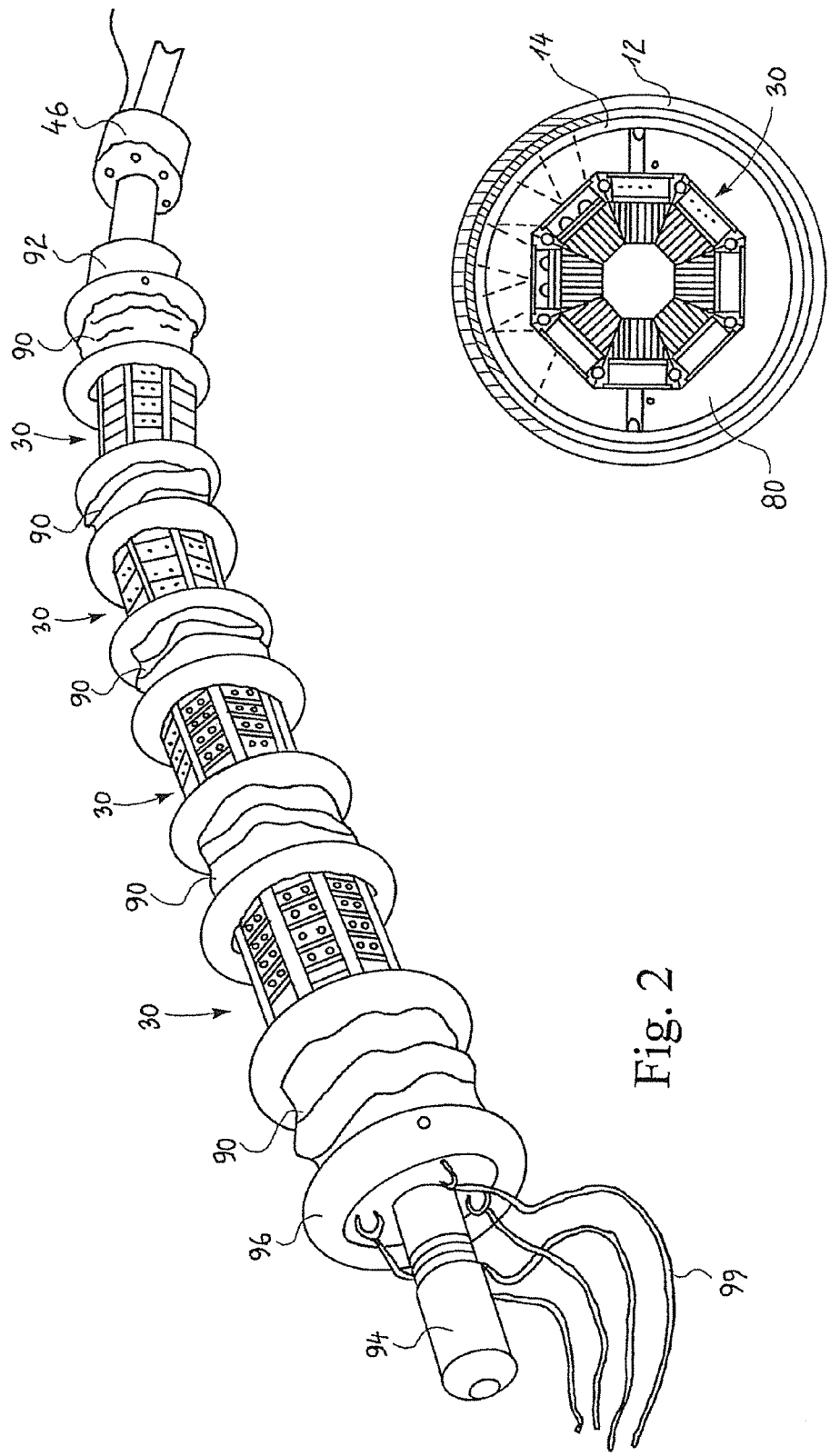

APPARATUS AND A METHOD FOR CURING A LINER OF A PIPELINE

CROSS-REFERENCE TO RELATED APPLICATION

This application is a divisional of co-pending application Ser. No. 12/527,846, filed Nov. 5, 2009, which is a national phase filing, under 35 U.S.C. §371(c), of International Application No. PCT/DK2008/000073, filed Feb. 19, 2008, the disclosure of which is incorporated herein by reference in its entirety.

FEDERALLY SPONSORED RESEARCH OR DEVELOPMENT

Not Applicable

BACKGROUND

The present invention relates to an apparatus for curing a liner of a pipeline, a method of curing a liner of a pipeline and a system or set of apparatuses for curing a liner of a pipeline.

When pipelines or generally lines or pipe systems, such as sewers or pipelines connected to sewers are to be renovated, trenchless methods have been developed throughout the last three or four decades involving the use lining tubes. In for instance leaky, worn or poorly maintained pipelines, such as sewer pipes, renovation is carried out nowadays by applying lining tubes inside the pipelines. The renovation is carried out in order to avoid infiltration and leakage that can be damaging to the environment. The task in renovating pipelines is to execute preventive maintenance and to perform accurate repairs to prevent further damage, e.g. seeping out of fluids. The renovation of pipelines by the use of liners may advantageously be used in underground pipe systems, e.g. renovating sewers and/or manholes.

The renovation by using pipelines can also take place above ground level, e.g. for renovating vertical pipes, such as process pipes, downpipes, vent ducts etc., such as vertical pipes and duct systems for housing associations in public buildings or in private houses.

The main advantage by using trenchless rehabilitation techniques including the introduction of a liner into a pipeline and curing the liner relates to the fact that the rehabilitation takes places from the inside of the pipeline eliminating the need to obtain access to the pipeline from the outside and the technique therefore involves a minimum work as compared to techniques necessitating digging a hole for obtaining access to the pipeline from the outside and further involves a minimum of inconvenience to the traffic production business and residence.

The technique of rehabilitating an underground pipe by introducing a lining tube impregnated by means of a resin into the pipe and causing the lining tube to be contacted to the inner surface of the pipe by applying pressure to the inside of the lining tube and at the same time applying heat to the lining tube for curing the resin and consequently solidifying the lining tube has been refined for many years. The technique of rehabilitating pipes by introducing a lining tube into the pipe and solidifying the pipe by curing the resin included in the lining tube has been carried out in accordance with two alternative techniques, the one including the simple technique of pulling the lining tube into the pipe to be renovated and forcing the lining tube outwardly into contact with the inner surface of the pipe and a different technique involving the so-called inversion of the lining tube as the lining tube is turned inside out as water or preferably pressurised air is used to force the lining tube in the inversion process into the pipe and afterwards solidifying the lining tube by introducing hot water or steam into the lining tube for causing the resin to cure.

A number of patent applications and patents describe the technique of renovating pipelines by using liners, some of which describe the so-called inversion technique. Others describe technique, in which the liner is simply pulled into the pipeline, e.g. described in WO 2004/104469 and the technique of solidifying or curing the resin has predominantly involved the use of hot water or hot steam for resins being thermal setting resins.

For more than one decade a further technique has been used involving curing the resin of the liner, which resin is cured by exposure to UV radiation by introducing a UV radiation source into the pipeline and curing the resin by using the UV radiating device. The technique of using UV radiation is, however, from several points of view highly disadvantageous although the technique minimises the use of energy as compared to the conventional technique of curing by using hot water or hot steam. Still, UV radiation as such is invisible to the workers or operators performing the work and extremely hazardous to the workers or operators and therefore, on the one hand a simple technical monitoring whether or not the device is operating is not available and, on the other hand the emission from the UV radiating device may cause extreme harm to the workers or operators since UV radiation is known to be cancerogenic. In addition, the known UV radiating devices are based on fairly old-fashioned vacuum tube technology and are therefore firstly fairly unstable and secondly the energy or power generated by the UV radiating device is varying during the short lifetime of the UV radiating device making the utilisation of the UV radiating devices fairly disadvantageous.

Recently the company DSM, NL, has developed and presented a novel photo-curable resin composition, which resin is curable by exposure to visible light in particular light of a wavelength of approximately 450 nm, i.e. blue light. The commercially available photo-curable resin is described in published Dutch patent 1007205, which is also referred to in published international patent application WO2005/103121 filed in the name of the above-mentioned company, which published international patent application refers to different prior art techniques and describes a advantageous photo-curing feature. Reference is made to the above-mentioned patent applications and patents.

SUMMARY

An object of the present invention is to provide an apparatus for curing a liner of a pipeline based on the use of light emitting diodes (LED's), which distinct from the vacuum tube based UV radiating devices are highly stable, have a fairly constant energy emission or power emission efficiency during the lifetime of the LED or LED's. A particular feature of the present invention relates to the fact that the LED's have a far higher efficiency than the prior art vacuum tube based UV radiating devices allowing the LED's to be used in a fairly high number or a multiplicity through the generation of a fairly high energy or power to surface area ratio.

A particular feature of the present invention relates to the fact that the apparatus according to the present invention for curing a liner of a pipeline is constructed with an integral fluid cooling increasing the efficiency of the apparatus. A further advantage of the present invention relates to the fact the apparatus according to the present invention for curing a liner of a pipeline may be constructed as a fairly compact and small unit allowing the photo-curing technique to be used in even small pipelines, such as pipelines having a diameter between 30 and 500 mm, or even larger or 30-300 mm, preferably 30-150 mm, such as e.g. 100-200 mm.

An advantage of the present invention relates to the fact that the compact apparatus according to the present invention for curing a liner of a pipeline may be combined with a plurality of apparatuses or unit providing a system or set of apparatuses, which allows the curing to be readily monitored by monitoring the effect of curing produced by each of the apparatuses or units and comparing the actual effect, e.g. measured as the curing temperature of the liner with a reference curve for determining the completion of the curing of the resin of the liner.

A further advantage of the present invention relates to the fact that the shallow shape of the LED's allows the LED's to be positioned in an array or in a plurality providing an even light or electromagnetic radiation intensity across the surface area of the liner irradiated by the apparatus including the plurality of LED's as compared to the conventional vacuum tube based UV radiating devices having a central tube located at a fairly last distance from the surface of the liner.

The above object, the above feature and the above advantages together with numerous other objects, features and advantages, which will be evident from the below detailed description of the invention is in accordance with a first aspect of the present invention obtained by an apparatus for curing a liner of a pipeline, said liner including a resin which is curable by exposure to electromagnetic radiation of a specific wavelength or a specific wavelength range, said apparatus comprising:

a housing defining opposite first and second ends, an outer wall of a substantially cylindrical configuration, and an inner wall defining a substantially unobstructed through-going passage extending longitudinally through said housing between said first and second ends,
 a pair of power supply wires for the supply of electrical power to said apparatus and extending from said first end of said housing,
 a plurality of LED's irradiating electromagnetic radiation of said specific wavelength or said specific wavelength range,
 said plurality of LED's being positioned and substantially evenly distributed at said outer wall of said housing,
 said plurality of LED's being connected through an electronic circuit to said pair of power supply wires, and
 said plurality of LED's being connected in thermal conductive relationship to heat dissipating elements freely exposed at said inner wall of said housing in said through-going passage of said housing for allowing a stream of cooling fluid to pass through said passage for dissipating heat from said heat dissipating elements and cooling said LED's.

The apparatus according to the first aspect of the present invention includes basically a housing, which defines a through-going passage for allowing a stream or cooling fluid, such as pressurised air to pass through the through-going passage for cooling the LED's, which communicate thermally with the through-going passage through the heat dissipating elements. The through-going passage may be configured for allowing the passage of pressurised air, which may also in certain applications of the apparatus serve to inflate the liner, however, according to alternative embodiments the through-going passage is in a closed loop connected to a cooling source, which may e.g. supply cooled air, such as low-temperature nitrogen or simply cooled atmospheric air possibly pressurised or alternatively the closed cooling circuit communicating with the through-going passage of the housing may serve to allow the flow of a cooling liquid, such as water, or any conventionally used cooling liquid used within the cooling or refrigerator industry. The flow of cooling liquid may be generated externally by e.g. a pressurizing air compressor, a water pump or the like and/or internally by e.g. a fan or pump.

It is to be understood that the electromagnetic radiation of the specific wavelength or the specific wavelength range primarily comprises visible light such as electromagnetic radiation within the wavelength area of approx. 400 nm-approx. 800 nm, in particular, as will be describes below, blue light of a wavelength of approx. 450 nm. However, the electromagnetic radiation may additionally or alternatively comprise IR such as electromagnetic radiation within the wavelength area of 800-1000 nm, alternatively or additionally UV, i.e. electromagnetic radiation within the wavelength area of 200-400 nm. It is particularly preferred that the electromagnetic radiation comprises the wavelength area of 230-1500 nm, such as 250-1000 nm, e.g. 400-800 nm, further preferred 400-600 nm, such as 430-500 nm, or alternatively 330-350 nm, 350-400 nm, 400-500 nm, 500-600 nm, 600-700 nm, 700-1000 nm and/or 1000-1500 nm.

The apparatus according to the first aspect of the present invention constitutes a basically self-contained unit as the housing, the pair of power supply lines together with the LED's and the through-going passage of the housing allow the unit to be simply set up by connecting the power supply lines to the power supply source, such as a DC supply source or alternatively an AC or main supply source connected to the power supply liner through a rectifying circuit and in addition the through-going passage is simply connected to the cooling fluid, such as a pressurised air generator.

Provided pressurised air or cooled air is used for cooling of the heat dissipating elements and consequently cooling of the LED's, the apparatus according to a presently preferred embodiment of the apparatus according to the first aspect of the present invention advantageously comprises a blower supported by said housing and connected to said pair of power supply wires for receiving electrical power therefrom and serving to enhance or generate a stream of cooling air through said through-going passage.

The housing constituting the central part of the apparatus according to the first aspect of the present invention may be configurated in any appropriate geometrical shape, such as a cylindrical shape, e.g. a circular cylindrical shape or a polygonal cylindrical shape. Irrespective of the actual geometrical configuration, however, in particular in connection with polygonal cylindrical shapes of the housing, the outer wall of the housing is advantageously and preferably composed of a set of curved or planar surface elements, each of said curved or planar surface elements extending longitudinally between said first and said second ends of said housing, said surface elements being of identical configuration.

According to the above-described presently preferred and advantageous embodiment of the apparatus according to the first aspect of the present invention comprising curved or planar surface elements, the LED's are preferably arranged at the curved or planar surface elements for allowing the LED's to be positioned at a preset and specific distance from the surface of the liner, which is to be irradiated by the LED's and consequently provide a specific and predetermined electromagnetic power input to the surface area in question in order to obtain a substantially even electromagnetic power impact to the entire surface of the liner covered by the apparatus.

The heat dissipating elements serving to allow heat generated by the LED's to be dissipated for cooling the LED's may be constituted by any appropriate heat transporting elements or components, such as elaborated heat pipe systems or alternatively and preferably simply be constituted by a finned heat dissipating element, which is positioned in the above described presently preferred embodiment of the apparatus including a set of curved or planar surface elements at the opposite side of the curved or planar surface element relative to the outer surface, at which the LED's are preferably arranged. The heat dissipation elements may additionally be provided at the end surfaces of the housing. The heat dissipating elements generally serve to limit the temperature of the LED's to a temperature well below the maximum permissible temperature of the chips of the LED's, which is specified to be 185° C. Preferably, the temperature of the LED's should be kept well below the above maximum chip temperature of 185° C., as the flow or stream of cooling fluid in combination with the heat dissipation elements serve to keep the temperature of the individual chips of the LED's below 130° C. Typically when using pressurised air, an air flow of 1-30 $m^3$/min. such as 10-20 $m^3$/min. is used The heat dissipation elements are preferably and advantageously combined with a thermal shut-down system constituted by a heat detecting element detecting the temperature of the LED's or the heat dissipating elements and turning off or shutting down the LED's by disconnecting the power supply to the LED's provided a maximum safe temperature has been exceeded.

In order to maintain the apparatus according to the first aspect of the present invention in a specific distance from the inner surface of the liner, which is to be irradiated by the LED's of the apparatus, the apparatus according to the first aspect of the present invention preferably comprises distance elements located at said first and second ends of the housing and maintaining the outer wall of the housing at a specific and accurate distance from the inner surface of the liner. The distance elements may according to a further embodiment of the apparatus according to the first aspect of the present invention preferably constitute end housing components provided at said first and second ends and extending or protruding beyond said outer wall of said housing in order to prevent physical contact between the outer wall of the housing and the surface of the liner.

According to a particular feature of the apparatus according to the first aspect of the present invention the apparatus may simply be linked to a similar or identical apparatus for providing an assembly of apparatuses or a set of apparatuses including a number of individual apparatuses, such as 2-12, e.g. 3-8, such as 4-6 individual apparatuses and for establishing the assembly of apparatuses, the individual apparatuses according to the first aspect of the present invention preferably comprise co-operating first and second connectors provided at the first and second ends, respectively, of the individual apparatuses and linking of the apparatuses together. In the co-operating connectors electrical connectors may be included for interconnecting the power supply lines and optionally additional signalling lines to be discussed below and also possibly linking the through-going passages of the individual apparatuses together for providing a through-going cooling fluid passage through all apparatuses of the assembly of apparatuses.

For allowing the assembly of apparatuses to adopt to a varying and non-linear shape of the pipeline the connectors are either first and second connectors interconnecting the individual apparatuses of the system or set of apparatuses preferably comprise cardanic linking or ball-and-socket joint elements for allowing the shifting of the position of one apparatus relative to the overall through-going longitudinal axis.

According to a particular feature of the apparatus according to the first aspect of the present invention an IR detector is provided in the apparatus for focussing on and adjacent liner surface for detecting the temperature of the liner, which IR detector is connected to measuring wires extending from the first end of the housing and optionally connected through electronic circuitry to a common measuring cable, e.g. through multiplexing, such as time or frequency multiplexing elements or simple HF or RF modulation circuits. The IR detector included in the apparatus according to the first aspect of the present invention allows the apparatus to be used for detecting the actual temperature of the liner while curing the liner and as will be discussed in greater details below the completion of the curing results in a stabilisation of the temperature within the liner, the detection of the temperature of the liner constitutes a simple and highly accurate measure for determining at which time further irradiation of the liner for causing curing of the resin of the liner should be terminated at the specific location in question. In this context it is to be understood that the apparatus according to the present invention is preferably used while moving the apparatus slowly through the pipeline within the liner and the ability by the presence of the IR detector to determine the actual temperature of the liner allows the apparatus to be moved controlled by the detection of the temperature signal, i.e. in response to detection of the completion of the curing process at a location.

The above object, the above feature and the above advantages together with numerous other objects, features and advantages, which will be evident from the below detailed description of the invention is in accordance with a second aspect of the present invention obtained by a system or a set of apparatuses, each apparatus including the features of the apparatus according to the first aspect of the present invention and in addition including the above described connectors for interconnecting the individual apparatuses into the assembly of apparatuses.

The above object, the above feature and the above advantages together with numerous other objects, features and advantages, which will be evident from the below detailed description of the invention is in accordance with a third aspect of the present invention obtained by a method of curing a liner of a pipeline, said liner including a resin, which is curable by exposure to electromagnetic radiation of a specific wavelength or a wavelength range, said method comprising:
   providing an apparatus comprising:
   a housing defining opposite first and second ends, an outer wall of a substantially cylindrical configuration, and an inner wall defining a substantially unobstructed through-going passage extending longitudinally through said housing between said first and second ends,
   a pair of power supply wires for the supply of electrical power to said apparatus and extending from said first end of said housing, a plurality of LED's irradiating electromagnetic radiation of said specific wavelength or said specific wavelength range, said plurality of LED's being positioned and substantially evenly distributed at said outer wall of said housing, said plurality of LED's being connected through an electronic circuit to said pair of power supply wires, and said plurality of LED's being connected in thermal conductive relationship to heat dissipating elements freely exposed at said inner wall of said housing in said through-going passage of said housing for allowing a stream of cooling fluid to pass through said passage for dissipating heat from said heat dissipating elements and cooling said LED's, and said method further comprising moving said apparatus within said liner while supplying electrical power to said LED's through said pair of power supply wires for irradiating electromagnetic radiation of said specific wavelength or said specific wavelength range onto said liner for causing said resin to cure, and the velocity of movement of said apparatus through said liner so as to cause a complete curing of said resin.

The above object, the above feature and the above advantages together with numerous other objects, features and advantages, which will be evident from the below detailed description of the invention is in accordance with a fourth aspect of the present invention obtained by a method of curing a liner of a pipeline, said liner including a resin which is curable by exposure to electromagnetic radiation of a specific wavelength or a specific wavelength range, said method comprising:

providing an assembly of apparatuses, each apparatus comprising:

a housing defining opposite first and second ends, an outer wall of a substantially cylindrical configuration, and an inner wall defining a substantially unobstructed through-going passage extending longitudinally through said housing between said first and second ends, a pair of power supply wires for the supply of electrical power to said apparatus and extending from said first end of said housing, a plurality of LED's irradiating electromagnetic radiation of said specific wavelength or said specific wavelength range, said plurality of LED's being positioned and substantially evenly distributed at said outer wall of said housing, said plurality of LED's being connected through an electronic circuit to said pair of power supply wires, said plurality of LED's being connected in thermal conductive relationship to heat dissipating elements freely exposed at said inner wall of said housing in said through-going passage of said housing for allowing a stream of cooling fluid to pass through said passage for dissipating heat from said heat dissipating elements and cooling said LED's, co-operating first and second connectors provided at said first and second ends, respectively, for allowing said apparatus to be connected to an identical apparatus for providing an assembly of apparatuses comprising a number of apparatuses such as 2-12, e.g. 3-8, such as 4-6 individual apparatuses, said first and second connectors when joint together providing a cardanic linking between any two apparatuses of said assembly, and an IR detector focusing on an adjacent liner surface for detecting the temperature of the liner and connected to a pair of measuring wires extending from said first end of said housing, said method further comprising adjusting the velocity of movement of said apparatus through said liner so as to cause a complete curing of said resin, said adjustment of said velocity of said movement of said assembly being performed by monitoring a temperature profile within said liner by means of said IR detectors of said apparatuses of said assembly and adjusting the velocity of movement of said assembly so as to detect a temperature profile having a maximum temperature at the trailing end of said assembly.

The method according to the third and fourth aspects of the present invention may advantageously and preferably be carried out while using the apparatus according to the first aspect of the present invention and advantageously and preferably also while using the system according to the second aspect of the present invention.

BRIEF DESCRIPTION OF THE DRAWINGS

The present invention is now to be further described with reference to the drawings, in which FIG. 2 is a perspective and schematic view of the system shown in FIG. 1 including a total of four apparatuses, each constituting the presently preferred embodiment of the apparatus according to the present invention for curing a liner of a pipeline, FIG. 3 is a vertical sectional view through the pipeline shown in FIG. 1 and disclosing the apparatus constituting the presently preferred embodiment of the apparatus according to the present invention for curing a liner of a pipeline when positioned in the liner of the pipeline.

DETAILED DESCRIPTION

Figure 1:
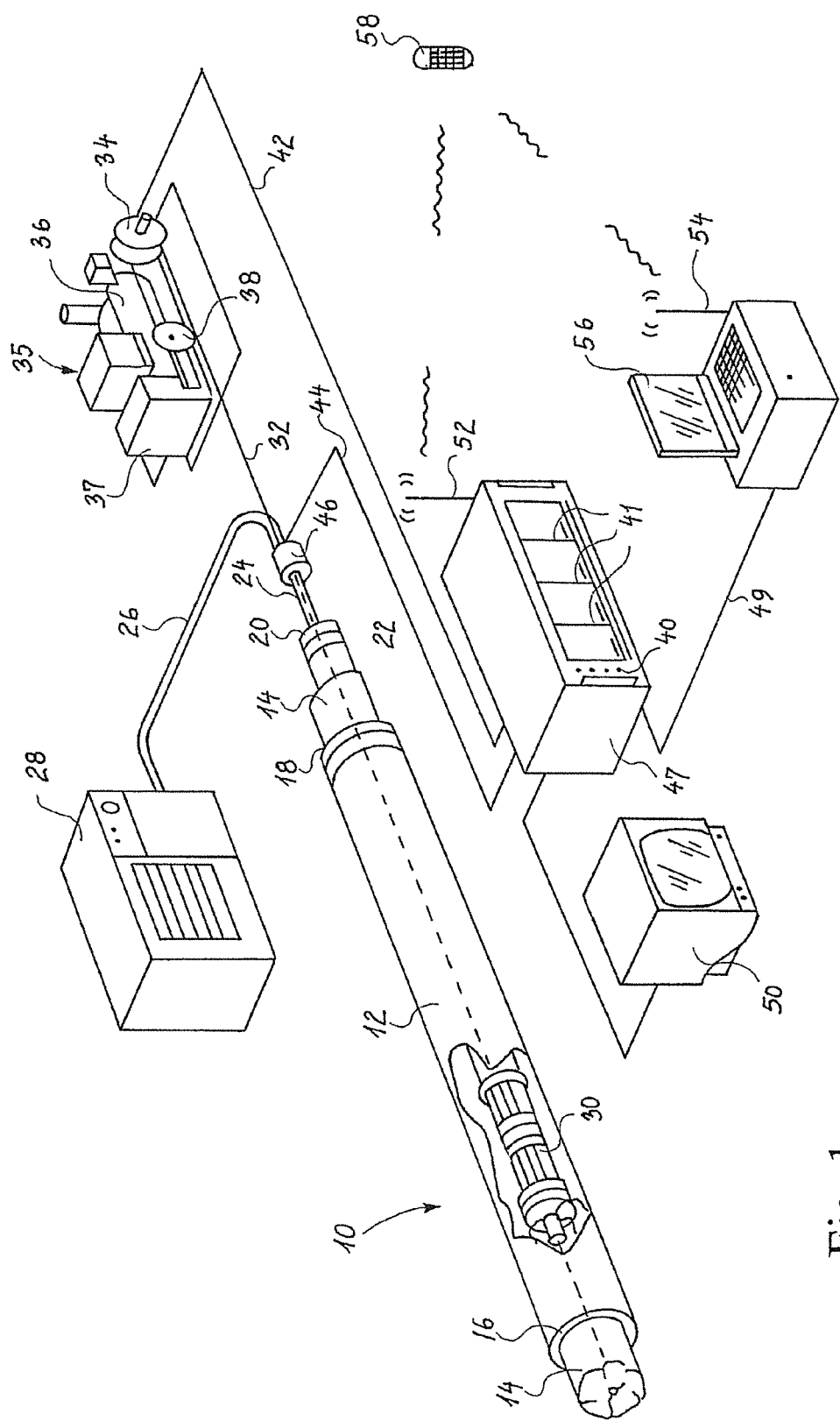
FIG. 1 is an overall perspective and schematic view of a system for curing a liner of a pipeline and including a set of apparatuses constituting a first and presently preferred embodiment of an apparatus according the present invention for curing a liner and further constituting a first and presently preferred embodiment of a method according to the present invention of curing a liner of a pipeline.

In FIG. 1 a system according to the present invention including a set of apparatuses according to the present invention for carrying out a method according to the present invention of curing a liner of a pipeline or generally a line is shown, designated the reference numeral 10 in its entirety. The pipeline is designated the reference numeral 12 and the liner of the pipeline is designated the reference numeral 14. The liner is impregnated with a curable resin curable by the exposure to electromagnetic radiation of a specific wavelength or a specific wavelength area such as visible light. A commercially available visible light curable resin is sold by the company DSM, NL. The product as such is described in published NL patent application 1007205. Reference is made to the above published NL patent application.

The pipeline 12 defines opposite first and second ends designated the reference numerals 16 and 18, respectively. In this context it is to be understood that the pipeline 12 is most often buried in the ground and is therefore only accessible from manholes, not shown in the drawings. At the first end 16 the liner 14 is closed off providing a sealed off or closed off end of the liner. At the second end 18 of the pipeline 12 the liner 14 extends freely into contact with a plug 20, which seals off the outer free end of the liner 14 as the liner 14 is fixated to the plug 20 by means of a circumferential and encircling closure ring 22.

The plug 20 defines a central through-going passage through which an assembly cable 24 extends, which assembly cable is connected to a set of apparatuses, one of which is designated the reference numeral 30, each of which constitutes a first and presently preferred embodiment of an apparatus according to the present invention for curing the liner 14 of the pipeline 12 in accordance with the method according to the present invention. Each apparatus 30 serves to emit resin curing electromagnetic radiation from a plurality of LED's located at the outer surface of the apparatus. The set of apparatuses 30 or the assembly of apparatuses 30 is to be described in greater details with reference to FIG. 2 below and the structure and the structural details of the apparatus 30 are to be further described below with reference to FIGS. 4-10.

The assembly cable 24 is composed of three sets of cables firstly a pressurised air supply line 26 supplying pressurised air generated by a pressurised air generator 28, secondly a pulling cable 32 by means of which the set of apparatuses 30 is pulled from the first end 16 of the pipeline 12 to the second end 18 of the pipeline 12 while curing and solidifying the liner 14 by exposing the resin of the liner to electromagnetic radiation, and thirdly a transmission cable 44.

The cable 32 is wound up on a winding wheel or winch 34 constituting a winding wheel of a winding machine designated the reference numeral 35 in its entirety and constituting a conventional winding machine well-known in the art per se. The winding machine 35 includes a motor 36 for causing the winding wheel 34 to rotate and further includes a central interface box connected through a signal cable 42 to a central computer processing unit 40 of the system 10. The winding machine 35 further includes a detector wheel 38 for detecting the speed of pulling the cable by winding the cable onto the winding wheel 34.

The transmission cable 44 supplies electrical power to the apparatuses 30 and further supplies electrical signals from detectors of the apparatuses 30 to the central processing unit or computer 40. The pressurised air supply line 26, the pulling cable 32 and the transmission cable 44 are all joined into the assembly cable 24 through a single joining connector 46.

The central processing unit or computer 40 is housed within a housing 47, which also includes an electrical power supply 41 for the central processing unit or computer 40 and the electrical power supply for the apparatuses 30. The central processing unit or computer 40 is connected through a signalling cable 48 to a monitor 50 and is further through a further signalling cable 49 connected to a PC 56 through which the overall operation of the system 10 may be monitored and also controlled by an operator. In an alternative embodiment the further signalling cable 49 is omitted and the operator who is conventionally located in a van or truck including the pressurised air generator 28, the winding machine 35, the housing 47 including the central processing unit or computer 40 and the power supply 41 and also the monitor 50 and who communicates through a cellular phone 58 with a remote control station, at which location the PC 56 is located, the signalling to and from the cellular processing unit or computer 40 and the PC 56 is established through a wireless link as the housing 47 includes a first aerial 52 and the PC 56 is connected to a second aerial 54.

The system 10 shown in FIG. 1 is operated in the following manner for carrying out the method according to the present invention. Initially, the set of apparatuses 30 is located at the first end 16 of the pipeline 12 at the sealed off left-hand end of the liner 14. The liner 14 is inflated by the supply of pressurised air from the pressurised air generator 28 through the pressurised air supply line 26 and the assembly cable 24 to the interior of the apparatuses 30 as the pressurised air is expelled from the left-hand end of the apparatuses 30 through an air outlet constituted by a plug having a specific number of holes or apertures for controlling the air flow through the apertures 30 to an amount of 1-30 m$^3$/min., preferably 10-20 m$^3$/min. The pressurised air is returned through the liner 14 and is allowed to escape through a small clearance between the assembly cable 24 and the above-mentioned central through-going aperture of the plug 20.

The LED's of the apparatuses 30 are supplied with electrical power from the electrical power supply unit of the housing 47 causing the resin of the liner 14 to solidify. The solidification of the resin of the liner 14 is monitored by means of heat detectors included in each of the apparatuses 30, which temperature detectors detect the surface temperature of the liner and transmit a liner surface temperature representing signal to the central processing unit or computer 40. As the left-hand end of the liner 14 has been solidified, which is detected by the above described temperature detectors, the winding machine 35 is controlled to cause the winding wheel 34 to rotate for winding up the cable 32, which winding is detected by means of the detector wheel 38 as the winding is controlled by the central processing unit or computer 40. The continuos movement of the set of apparatuses 30 from the first end 16 of the pipeline 12 to the second end 18 of the pipeline 12 is controlled by the central processing unit or computer 40 as a curing or solidification of the resin of the liner 14 is detected by means of the temperature detectors included in each of the apparatuses 30 and the speed of movement by pulling the apparatuses 30 by means of the pulling cable 32 is controlled from the central processing unit or computer 40 and established by means of the winding machine 35. The operation of the system 10 is monitored by means of the PC 56 and provided any fault situation occurs the operator or technician located at the remote control station may address the central processing unit or computer 40 for causing an interruption of the curing process or the change of a functional parameter such as the speed of pulling the apparatuses 30, e.g. in response to a change of the rate of curing of the resin of the liner 14.

The liner 14 is shown as a single liner, however, the liner may be constituted by a multilayer liner or a liner including initially an outer sealing membrane, such a PVC membrane, which sealing membrane is after inversion of the liner into the pipeline 12 and after curing of the resin of the liner removed from the interior of the liner as is well-known in the art per se.

Figure 4:
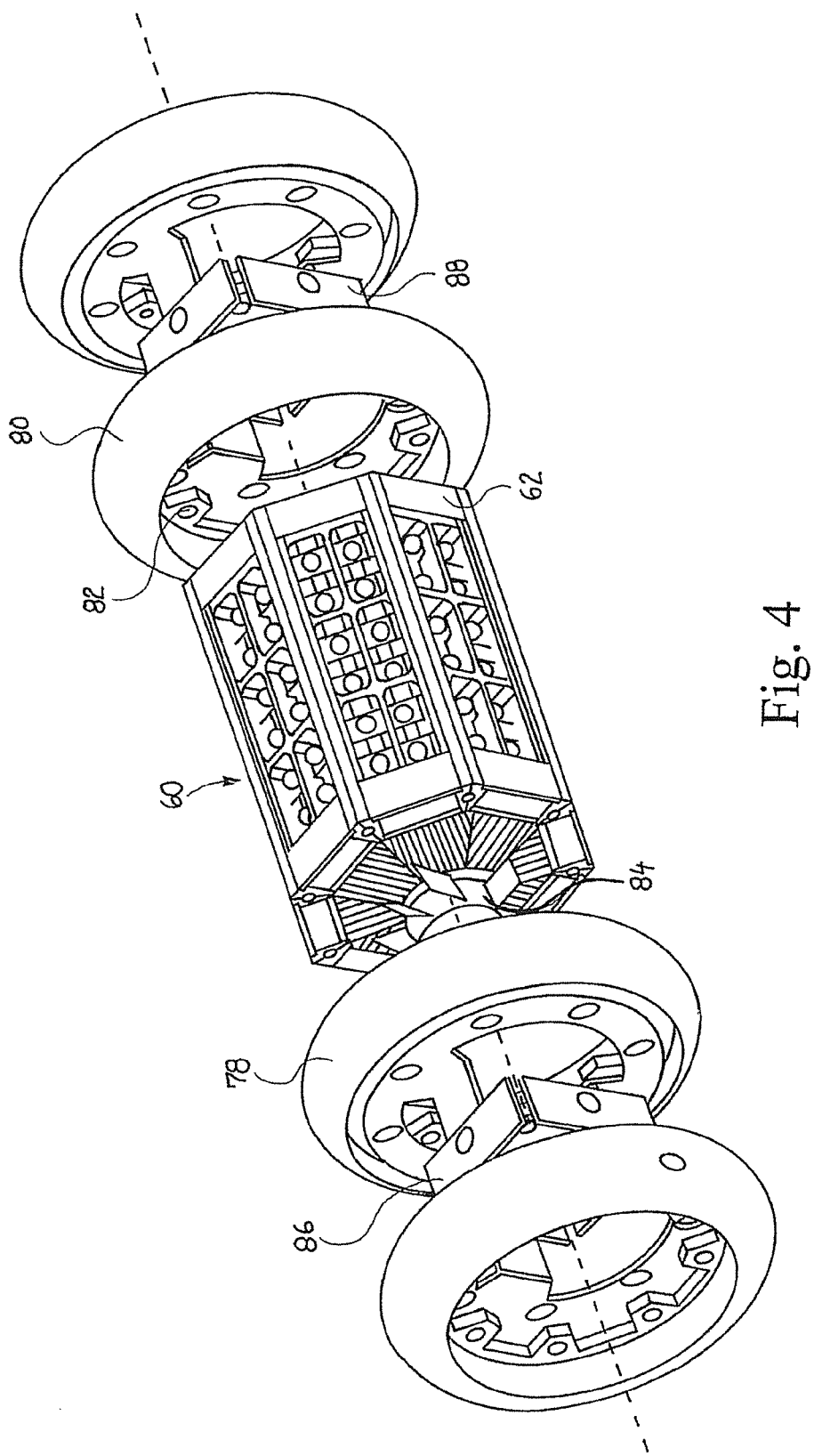
FIG. 4 is a partly exploded view of the apparatus also shown in FIGS. 2 and 3.
Figure 5:
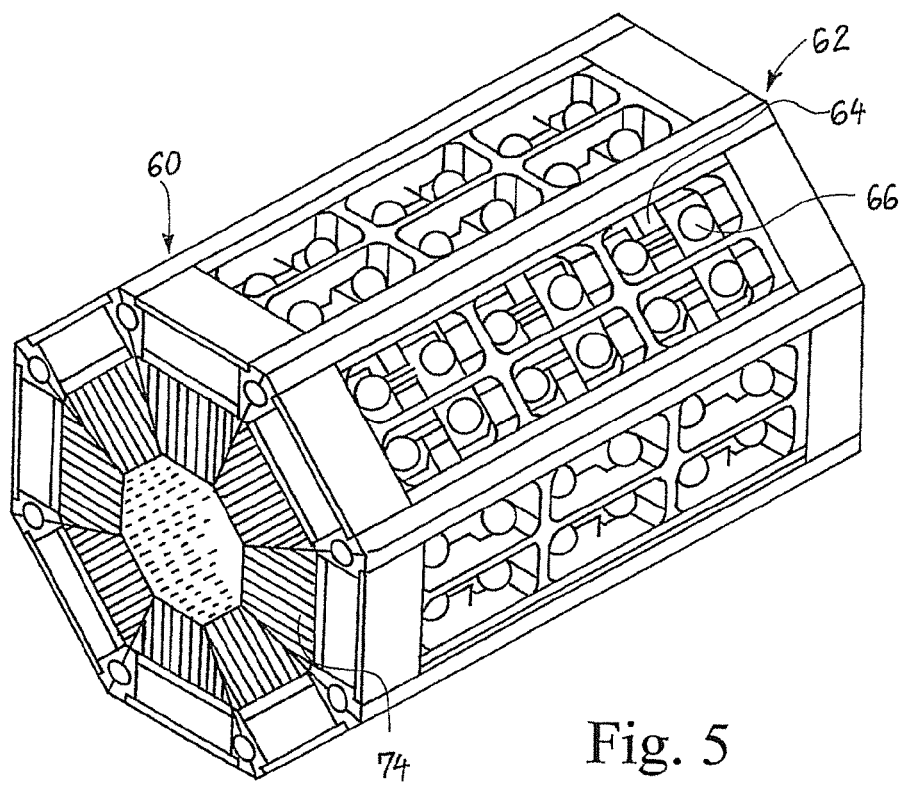
FIG. 5 is a perspective and schematic view of a central housing component of the apparatus also shown in FIGS. 2-4.
Figure 6:
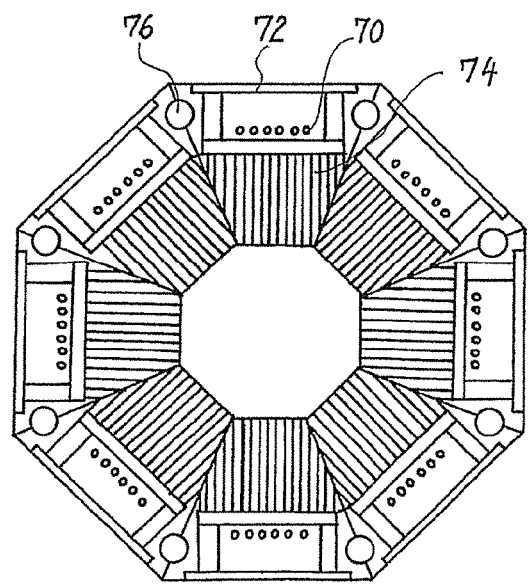
FIG. 6 is an end view of the central housing part shown in FIG. 5 of the apparatus also shown in FIGS. 2-4.

In FIG. 2 four apparatuses 30 are shown together constituting an assembly of apparatuses and disclosing in greater details the structure of the apparatuses 30 and also the linking between any two adjacent apparatuses. Reference is further made to FIGS. 4, 5 and 6. Basically, the individual apparatus 30 centrally comprises a housing component shown in a perspective and schematic view in FIG. 5 and in a vertical sectional view in FIG. 6. The housing component is designated the reference numeral 60 and is composed of a total of eight identical profiled housing elements together constituting an octagonal structure, in which a central through-going passage is provided for allowing the passage of pressurised air through the housing part 60 and the apparatus 30 for cooling the electronic circuitry of the apparatus. One of the profiled housing elements is designated the reference numeral 62.

Each of the profiled housing elements 62 includes a central PCB 64, on which a total of twelve diodes 66 are mounted. Each apparatus 30 including a housing part 60 consequently includes a total of 96 diodes comprising 95 LED's and a single temperature or IR detecting diode serving to monitor the temperature of the inner surface of the liner 14. In addition, the PCB includes a temperature detector serving to prevent that the temperature of the LED's exceeds the permissible maximum temperature as the temperature detector is connected in a series configuration with the light emitting diodes and serves to disconnect the light emitting diodes from the power supply in case of the detection of a temperature exceeding the maximum allowable or permissible temperature.

In front of the PCB the profiled housing element 62 comprises a front part constituted by an insulating, preferably plastics component, such as a component made from POM and defining a total of six openings within each of which two diodes are exposed. The front part further defines opposite hollow end sections, in which electrical connectors are received for connecting the PCB of the profiled housing element 62 to the adjacent apparatus and through the assembly cable 24 to the housing 47 shown in FIG. 1 including the central processing unit or computer 40 and the power supply unit 41. The connector mentioned above is illustrated in FIG. 6 illustrating an end view of housing part 60 shown in FIG. 5. One of the connectors is designated the reference numeral 70. The front part of the profiled housing element 62 further provides a recess, in which a transparent cover 72 is received serving to provide mechanical protection to the diodes located below the protective cover.

Opposite to the protective transparent cover 72, the PCB 64 is at its face opposite to the diodes 66 connected in a thermal conductive relationship with a heat radiating and finned metallic element 74 serving to guide heat generated by the light emitting diodes 66 to the interior of the housing part, in which interior a through-going passage is provided, in which through-going passage the compressed air is forced through the housing part for causing cooling of the finned metallic elements 74 and consequently cooling of the light emitting diodes 66. Each of the profiled housing elements 62 is configured for allowing the profiled housing element to be joined to an adjacent profiled housing element for providing the octagonal housing part 60 and is at its sides surfaces, which are to be joined to the side surfaces of the adjacent housing part provided with semi-circular recesses, which are designated the reference numeral 76 for allowing the total of eight profiled housing elements 62 to be assembled by means of a total of eight through-going bolts and at the same time joining the housing part to distance elements of the assembly 30, which distance elements are shown in FIG. 4.

In FIG. 4 the central housing part is shown composed of a total of eight profiled housing elements 62 and at opposite ends of the housing part 60 distance elements 78 and 80 are positioned which are to be joined with the central housing part 60 by means of the through-going bolts, which are to be fixated by means of nuts or similar arresting elements. Each of the distance elements 78 and 80 comprises a circumferential bead cast from a very resistant material, such as POM or similar plastic materials, each of which beads defines inwardly protruding flanges 82 serving to be fixated to the housing part 60 as described above by means of the above described bolts and nuts. Within the distance elements 78 and 80 or at least within one of the distance elements 78 and 80 a fan 84 is positioned serving to assist in forcing the pressurised cooling air through the housing part 60 and consequently cooling the heat generating LED's by dissipating heat from the finned metallic elements 74.

Through experiments performed by the applicant company it has been realised that the sufficient cooling of the LED's may in some instances be obtained without the use of pressurised air by utilising the capability of the fan 84 for cooling the finned metallic elements 74.

As the distance element is joined to the central housing part 60 and the distance element 80 is joined to the opposite end of the housing part 60, the distance element 78 is joined through a cardanic joint 86 to a distance element corresponding to the distance element 80 and joined to a central housing part of the adjacent apparatus. Similarly, the distance element 80 is joined through a further cardanic joint 88 to a distance element of an adjacent apparatus similar to the distance element 78.

In the assembled set of apparatus as shown in FIG. 2 electrical cables extend through the cardanic joints 86 and 88 for interconnecting the one apparatus to the next by interconnecting respective connectors, such as the connector 70 shown in FIG. 6 to the adjacent connector at the adjacent apparatus. Furthermore, the distance elements 78 and 80 allow, as is evident from FIG. 2, that flexible bellow elements 90 be provided for sealing off the flexible cardanic joining between the apparatuses 30, which bellow elements are designated the reference numeral 90.

The front end of the assembly or cellular apparatuses 30 shown in FIG. 2 is connected through a distance element similar to the distance element 80 shown in FIG. 4 to a connector 92, to which the assembly cable 90 is fixated. The opposite or rear or trailing end of the assembly of apparatuses shown in FIG. 2 is provided with a video camera adapter 94 including air outlet openings joined to a separate distance element 96, to which a plurality of ropes 99 are further connected, which ropes serve to allow the assembly of apparatuses to be introduced into the liner by pulling the assembly or cellular apparatuses into the liner as will be described below.

In FIG. 3 a vertical sectional view of the pipeline 12 and the liner 14 is shown disclosing the end face of the housing part 60 and further the distance element 80, the outer diameter of which is adapted to the inner diameter of the liner. The overall modular structure of the apparatus 30 allows the distance elements 78 and 80 to be substituted by differently sized distance elements provided the apparatus 30 is to be used in a pipeline having a slightly smaller or slightly larger inner diameter as compared to the outer diameter of the distance elements 78 and 80. Furthermore, the modular structure of the apparatus 30 and further the modular structure of the assembly of apparatuses allows the apparatus to be combined with additional modular elements including additional relevant technical systems, such as a separate module including e.g. a pressure measuring apparatus, a separate video camera or a separate IR detecting camera and/or a separate distance measuring module serving to measure the inner diameter of the liner. A separate module may further be provided including additional circuitry.

In the presently preferred embodiment of the apparatus according to the present invention a total of ninety-five LED's are provided as stated above consuming in total approximately 400 W and generating a light intensity of 100 mW/cm$^2$. For preventing the LED's from being excessively heated the temperature detector turns off the power supply provided a temperature in excess of 100° C. be detected and for maintaining under normal operational conditions a temperature lower than 70° C., a cooling air stream of 0.7 m$^3$/min was generated by the supply of pressurised air and/or by employing integral fans, such as the fan 84 shown in FIG. 4 included in the apparatus 30.

The ropes 99 extending from the rearmost end of the assembly of apparatuses 30 shown in FIG. 2 are used in the initial process of positioning the assembly of apparatuses at a position within the liner 14 at the first end 16 of the pipeline 12 as in the initial process the liner 14 is introduced into the pipeline 12 through inversion or by simply pulling the liner 14 through the pipeline and subsequently closing off the rearmost end of the liner as is illustrated in FIG. 1, at which stage of closing off or sealing off the liner at the rearmost end of the liner a reversing roller or reversing wheel is fixated to the closed off or sealed off end of the liner within the liner for allowing the ropes 99 to be used for pulling the assembly of apparatuses 30 from the front end, i.e. at a position at the second end 18 of the pipeline 12 to the rearmost end of the liner at the first end 16 of the pipeline 12.

Figure 7:
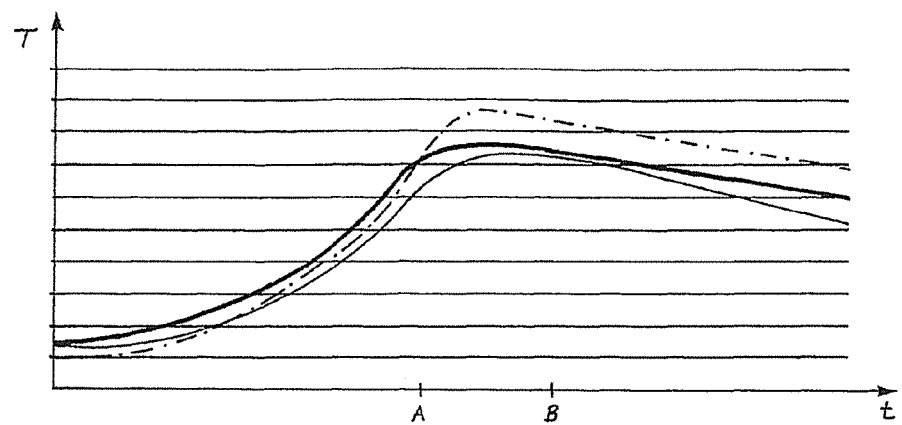
FIG. 7 is a diagram illustrating temperature response curves by utilising the apparatus and the method according to the present invention as illustrated in FIG. 1.

In FIG. 7 a diagram is shown illustrating a temperature response curve of a liner, which has been cured by exposure to visible light in accordance with the teaching of the present invention. Along the first axis the time after initiating the liner to exposure of visible light of the specific wavelength, by which the resin is cured such as the wavelength of 450 nm is presented and along the second axis the temperature measured at the inner surface of the liner is presented.

From the time of initiating exposure of the liner to electromagnetic radiation until the time A the temperature within the liner raises very rapidly, indicating that curing is taking place whereas from the point of time A until the point of time B the temperature does not to any substantial extent increase or raise in spite of the continuos exposure of the resin to electromagnetic radiation of the specific wavelength whereas after the time B the temperature simply drops.

The curves shown in FIG. 7 represent actual measuring results while using a prototype of the apparatus 30 shown in FIGS. 1-6. The curves in addition allow for an extremely accurate and simple technique for controlling the movement of the assembly of apparatuses through the liner as is illustrated in FIG. 1 by simply monitoring the temperature, as indicated above, at each of the apparatuses and based on the curves shown in FIG. 7 predicting the time necessary for additional exposure of a specific inner surface area of the liner for obtaining complete curing of the resin as the central processing unit or computer of the system may simply monitor the temperature of each of the apparatuses of the assembly of apparatuses and control the forward movement of the assembly of apparatuses so as to obtain a temperature profile from the front end of the assembly of apparatuses to the rear end of the assembly of apparatuses representing points between the points of time A and B of FIG. 7. The controlling of the movement of the assembly of apparatuses through the liner to be cured may be refined in numerous ways depending on the actual composition of the resin used, the thickness of the liner, the transparency of the materials of the liner and the power emitted from the apparatuses used for curing. At any rate, it is, however, contemplated that the detection of the temperature within the liner at a position located between the front end and the rear end of the assembly of apparatuses when moving the assembly of apparatuses through the liner may be used as a simple measure for controlling the proper and correct movement of the assembly of apparatuses through the liner for obtaining a complete and correct curing of the resin of the liner.

Figure 8:
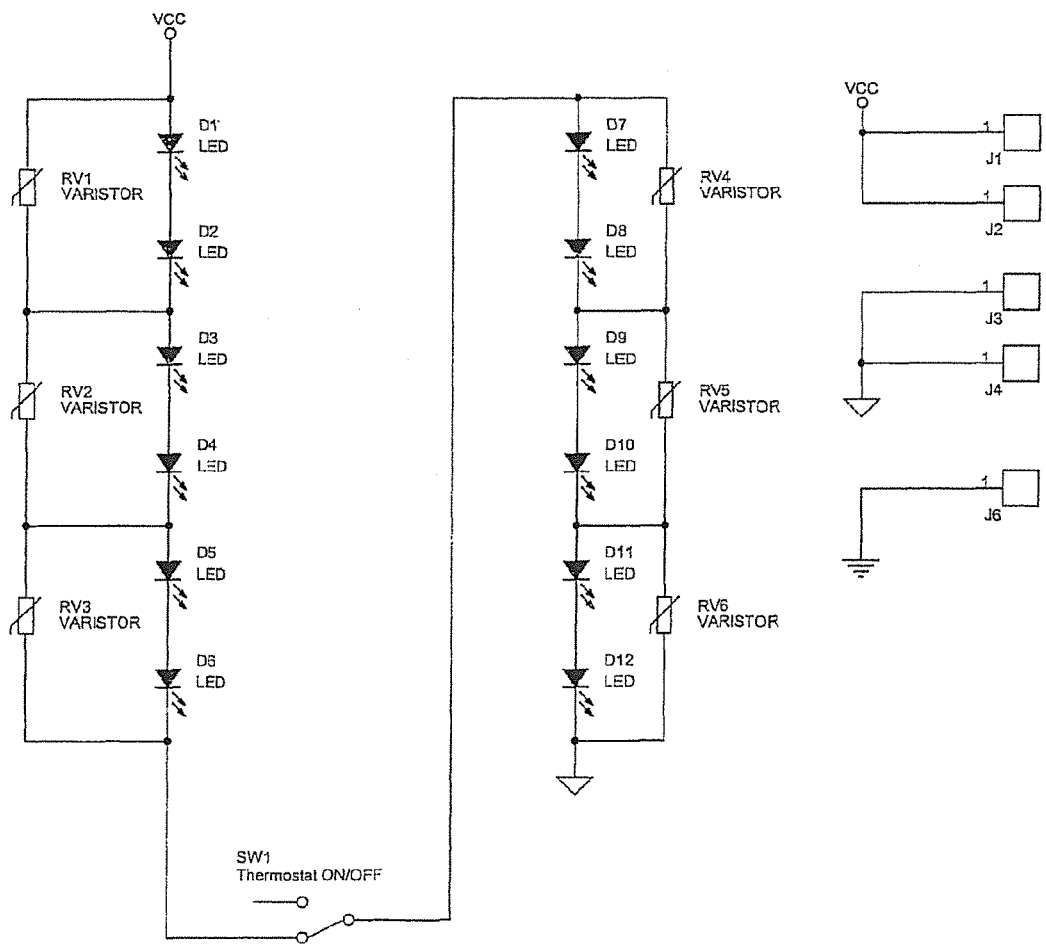
FIG. 8 is a diagrammatic view of an electronic circuitry of the presently preferred embodiment of the apparatus according to the present invention.

In FIG. 8 a diagram is shown illustrating the electronic circuitry of the LED's included within the profiled housing element 62 shown in FIG. 64 as the total of twelve light emitting diodes or LED's irradiating visible light, such as visible light of a wavelength of 455 nm, is connected in a series configuration, in which a temperature detector or thermostat is included for shutting off the supply of power to the LED's provided an excessive temperature be detected by the thermostat. In the prototype implementation of the presently preferred embodiment of the apparatus 30 shown in FIGS. 4-5 LED's of the type Luxeon LXHL-PRO9 were used.

Figure 9:
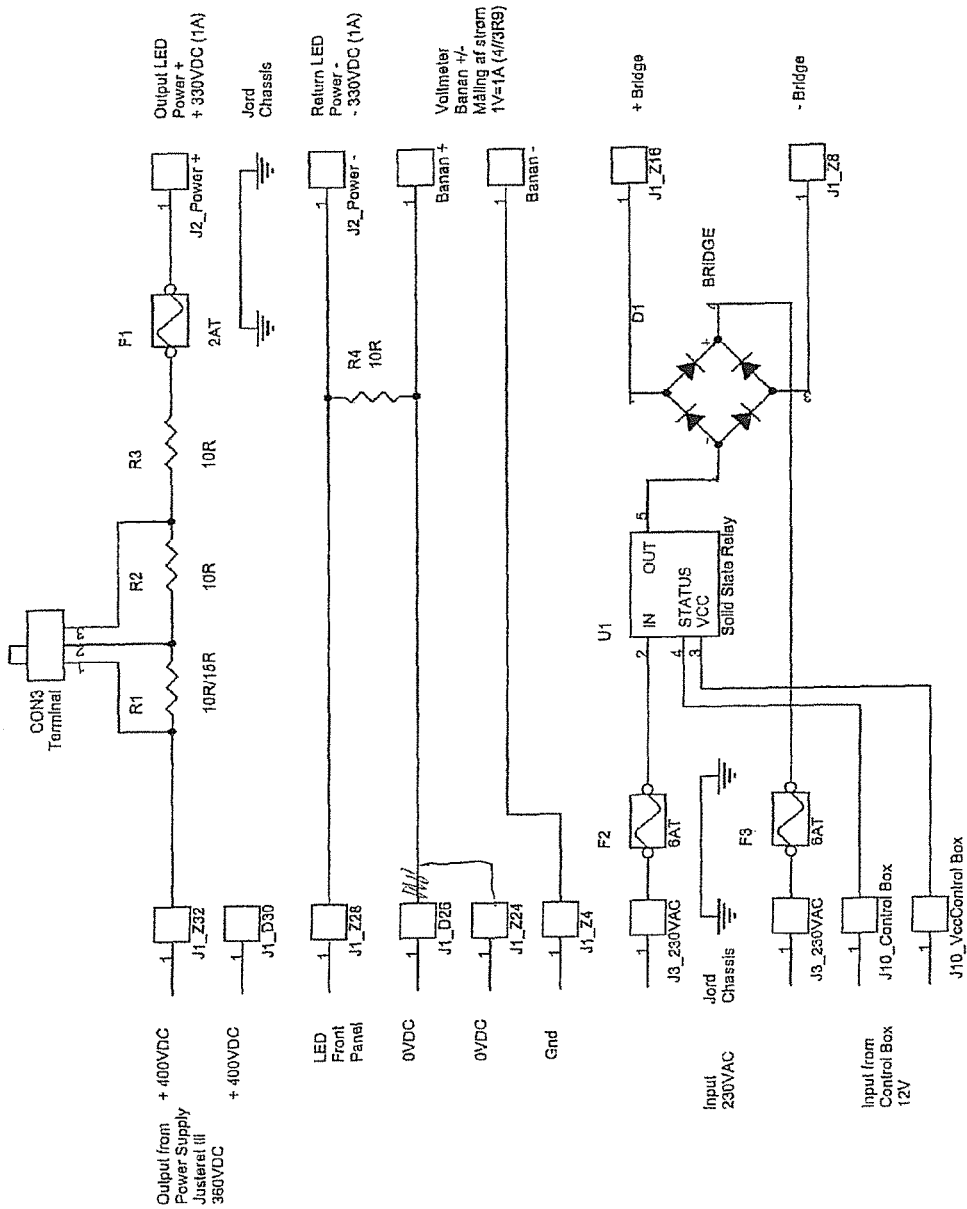
FIG. 9 is a diagrammatic view of a wiring scheme of a power supply unit for supplying electrical power to the apparatus constituting the first and presently preferred embodiment of the apparatus of the apparatus according to the present invention as shown in FIGS. 2-6.
Figure 10:
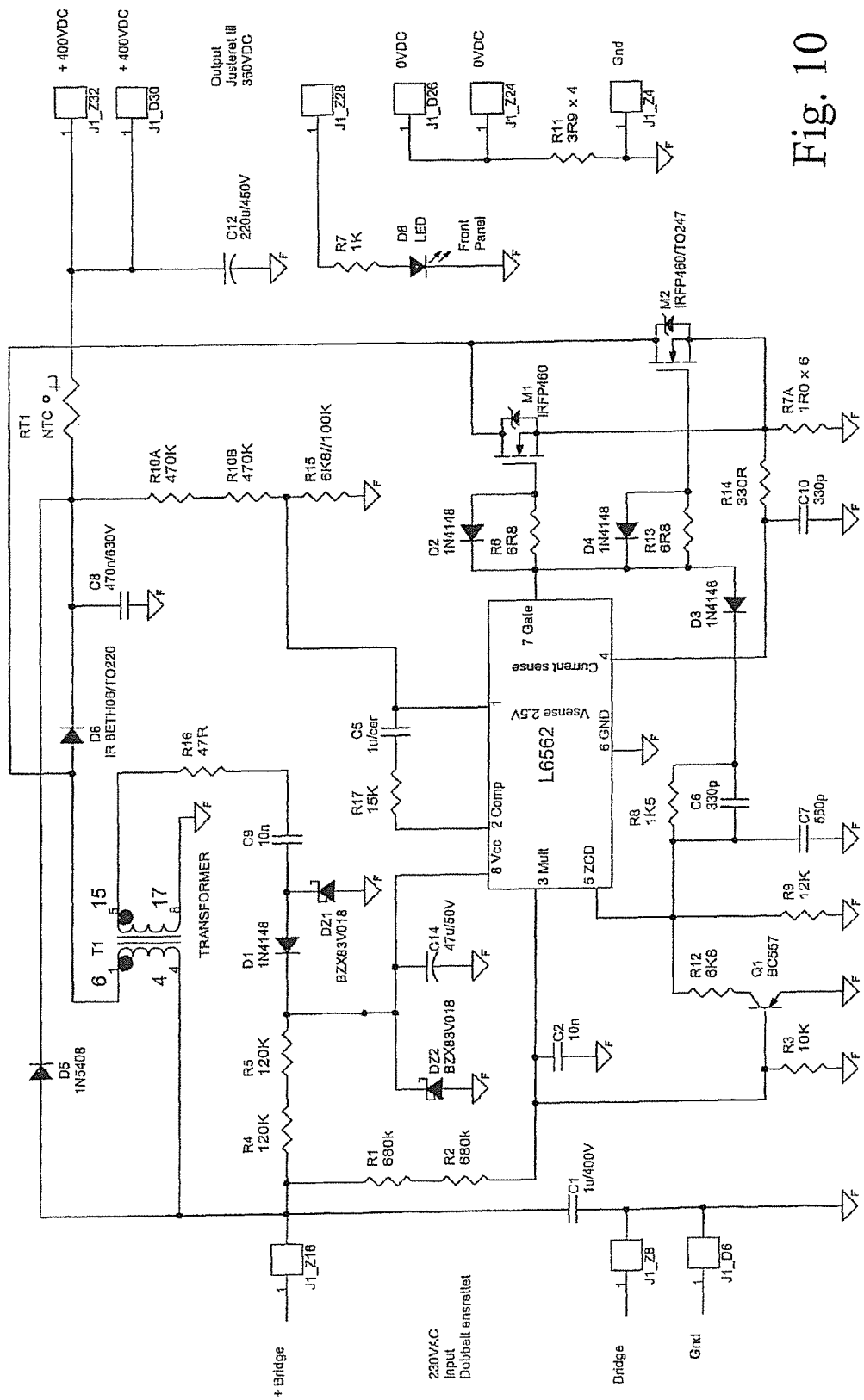
FIG. 10 is a diagrammatic view illustrating in greater details the electronic circuitry of the wiring scheme shown in FIG. 9.

In FIGS. 9 and 10 a wiring diagram and a circuit diagram illustrating the electronic circuitry of the prototype implementation of the power supply for the prototype of the presently preferred embodiment of the apparatus according to the present invention for curing a liner of a pipeline is illustrated, which diagram is contemplated to be self-explanatory and therefore needs no specific description.

In the below alternative embodiments of the apparatus according to the present invention, components or elements identical to components or elements, respectively, previously described are designated the same reference numerals as discussed above, whereas components or elements serving the same purpose as components or elements, respectively, described above, however differing in shape or structure from the previously described components or elements, respectively, are designated the same reference numeral as used above, however, added a further signature or marking for identifying the difference in shape or structure.

Figure 11:
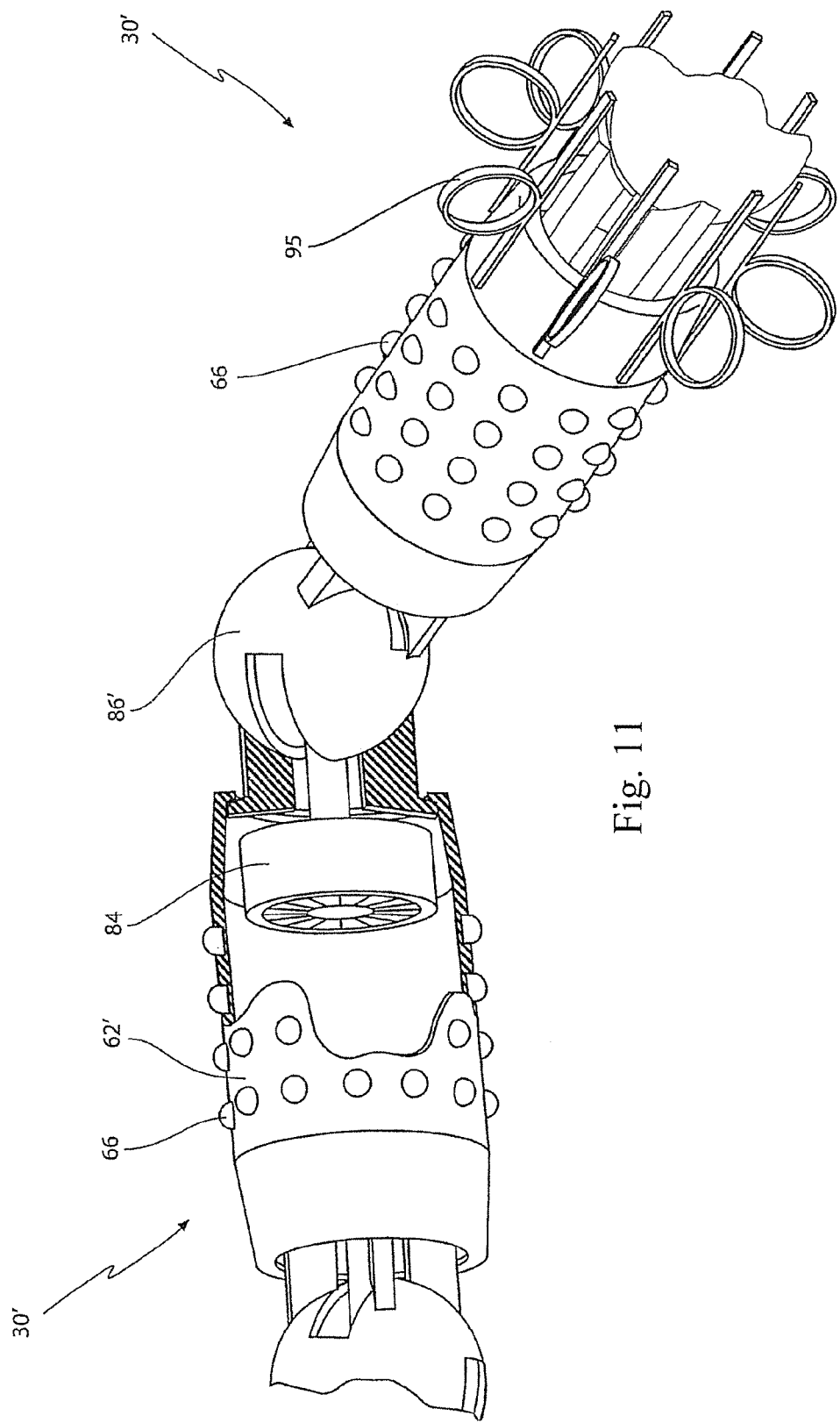
FIG. 11 is an overall perspective and schematic view of a second embodiment of the apparatus according to the present invention for curing a liner of a pipeline.

In FIG. 11, a set of two apparatuses according to a second embodiment of the apparatus according to the present invention for carrying out the method according to the present invention is shown, each designated the reference numeral 30'. The two apparatuses 30' are joined to one another by means of a ball-and-socket joint 86'. Each of the two apparatuses 30' differs from the above described first embodiment 30 in that the housing of the apparatus defines a circular cylindrical outer wall from which the individual LED's 66 protrude. However, as far as the functionality of the individual LED's 66 of the apparatus 30' is concerned, reference is made to the above described first embodiment. Similarly, like the first embodiment, the second embodiment 30' of the apparatus according to the present invention preferably includes a temperature detector in order to monitor the temperature of the resin being cured, and at the same time the apparatus 30' preferably includes a shut-down circuit or circuit breaker serving to disconnect the power supply to the LED's 66 in case an overtemperature or overheating situation is to occur, which situation might eventually cause the chips of the individual LED's 66 to be destroyed by excessively heating the chips of the LED's 66. Similar to the above described first embodiment, the second embodiment includes an integral fan 84 for forcing air through the interior of the individual apparatus for causing cooling of the LED's 66.

Whereas the above described first embodiment 30 includes elements interconnecting the individual apparatuses in the composite system as shown in FIG. 2, the second embodiment of the apparatus 30' shown in FIG. 11 includes no such bellows in order to allow each and every apparatus to operate independently of the operation of an adjacent apparatus, provided the adjacent apparatus is turned down or shut off as the supply of cooling air into the interior of the individual apparatus 30' is generated by the fan 84 of the individual apparatus 30'.

Whereas the first embodiment of the apparatus according to the present invention shown in FIGS. 2-4 included a specific diameter distance element 78 and 80, the second embodiment 30' shown in FIG. 11 is adjusted or adapted to a specific inner diameter of the pipeline to be renovated by the adjustment of flexible distance elements 95 constituted by closed loop plastic elements simply assembled from conventional wire strappers.

Figures 12A, 12B:
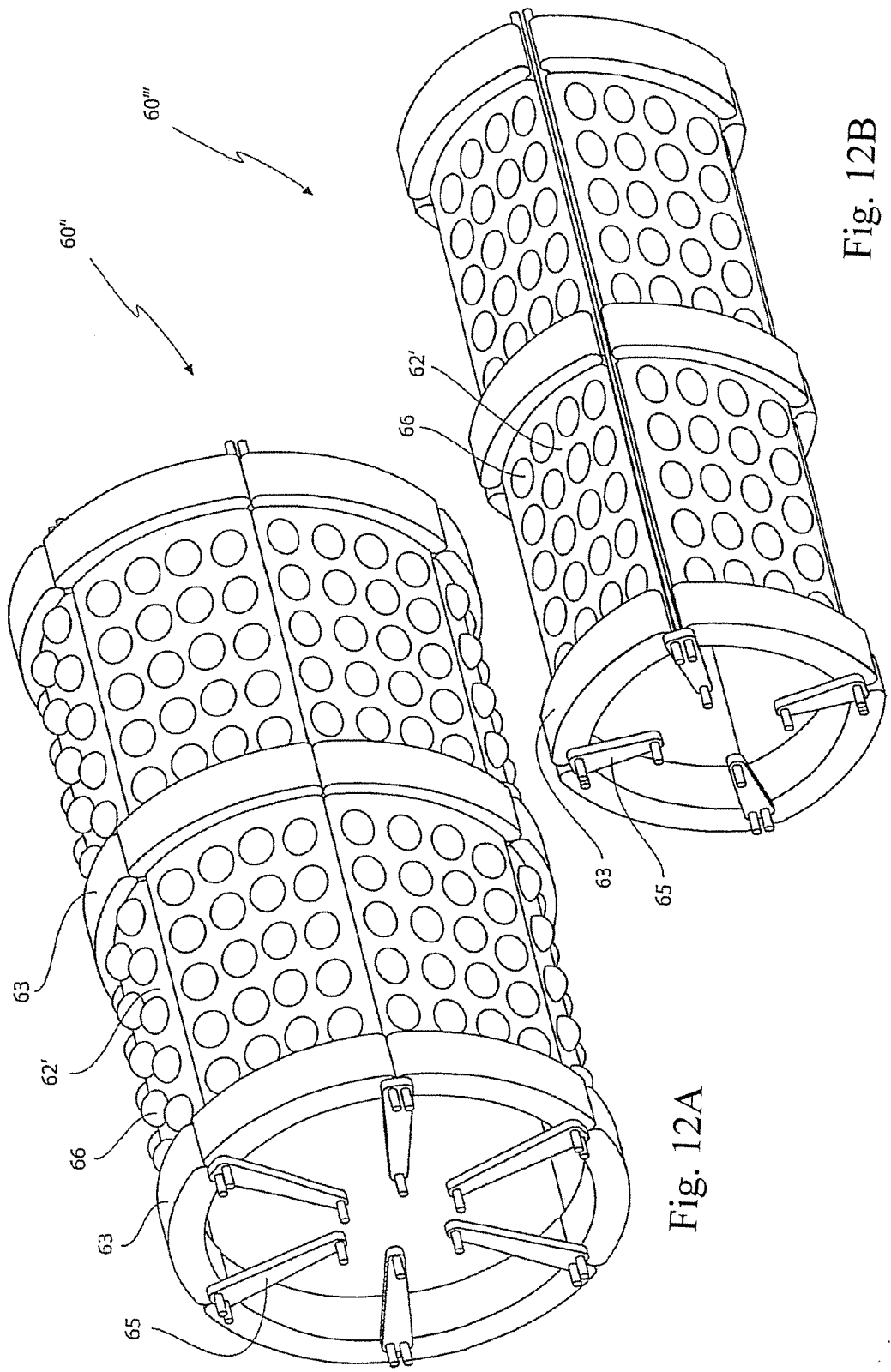
FIGS. 12a and 12b are perspective and schematic views of a third embodiment of the apparatus according to the present invention for curing a liner of a pipeline, and embodied as a modular system allowing the apparatus to be adapted to specific inner liner diameters.

In FIGS. 12a and 12b, a diameter adjustable third embodiment of the housing part 60" and 60'", respectively, is shown. In FIG. 12a, a total of six curved housing elements 52' is assembled into a basically circular cylindrical housing, which housing elements each includes twenty LED's. The housing elements are joined together by means of end connector elements designated the reference numeral 63, which are further fixated in the above described circular cylindrical configuration by means of radially extending locking and distance pins 65. In the third embodiment shown in FIG. 12a, two circular cylindrical sections, each composed of six housing elements 62', are combined into an apparatus including a total of twelve housing elements 62'.

Due to the modular structure of the third embodiment shown in FIG. 12a, the outer diameter of the apparatus may be readily modified by reducing the number of housing elements 62', from which the cylindrical apparatus housing is composed. In FIG. 12b, the number of housing elements is reduced from six to four in each of the sections of the apparatus, reducing the overall outer diameter of the apparatus, however, also modifying the cylindrical configuration from a strict circular cylindrical configuration to a configuration slightly deviating from the circular cylindrical configuration.

Figure 13:
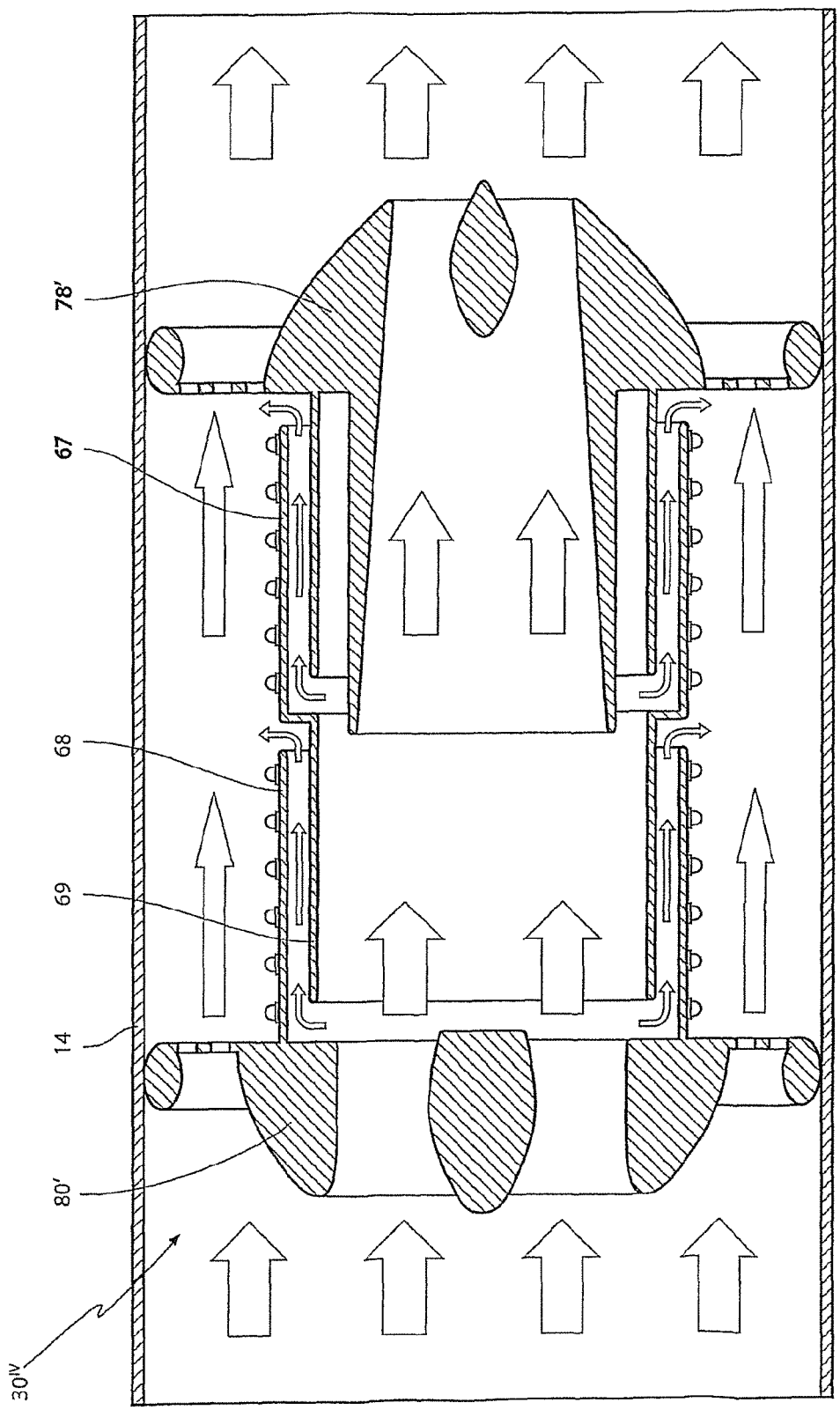
FIG. 13 is a vertical sectional view of a liner in which the apparatus according to the present invention implemented in accordance with the first embodiment, however slightly modified, is positioned, and illustrating the airflow through the apparatus and through the liner.

In FIG. 13, a vertical sectional view is shown, illustrating schematically a technical principle of dividing the air stream through the interior of the apparatus according to the invention into separate air streams and at the same time controlling the air stream through the individual apparatus and past the individual apparatus by configuring the cross section of the housing of the apparatus in accordance with aerodynamic principles which are known from the aircraft industry as such, by using the principle of the ideal gas law. In FIG. 13, the pipeline 14 is shown and a fourth embodiment of the apparatus $30^{iv}$ is shown, which apparatus is composed of two sections, a front section 67 and a rear section 68. The front section has an air-cooling path separated from the air-cooling path of the rear section 68, established by an interior separation wall 69. The fourth embodiment 30' further differs from the above described embodiments in that the distance elements of the embodiment similar to the distance elements 78 and 80 shown in FIG. 4 provided at the front end and the rear end of the apparatus are different from one another, as the front end distance element 78' includes an internally tapering passage defining a smaller aperture at the outlet as compared to the inlet, whereas the rear distance element 80' allows a substantially free air passage into the interior of the apparatus $30^{iv}$. The configuration of the interior passage of the front distance element 78' is believed to provide a forced air cooling due to the constriction at the outlet of the distance element and also a pressure change within the interior of the housing similar to the pressure change above the wing of an airplane or an aircraft.

Although the present invention has above been described with reference to a specific and presently preferred embodiment of an apparatus according to the present invention for curing a liner of a pipeline constituting a single apparatus of a set or an assembly of apparatuses according to the present invention and constituting an apparatus for carrying out the method according to the present invention of curing a liner of a pipeline, numerous amendments and modifications of the apparatus, the assembly and the method are obvious to a person having ordinary skill in the art and such modifications or amendments are to be construed by the present invention as defined in the appending claims.

What is claimed is:

1. A method of curing a liner of a pipeline, the liner including a resin that is curable by exposure to electromagnetic radiation of a specific wavelength or in a specific wavelength range, the method comprising:
   (a) providing an apparatus comprising:
      (i) a housing defining opposite first and second ends, the housing comprising an outer wall and an inner wall defining a passage extending longitudinally through the housing between the first and second ends;
      (ii) a plurality of LED's on the outer wall of the housing and operable to irradiate electromagnetic radiation of the specific wavelength or in the specific wavelength range; and
      (iii) a plurality of heat dissipating elements on the inner wall of the housing and exposed to the passage;
   wherein the plurality of LED's are connected in thermally-conductive relationship to the heat dissipating elements, whereby heat is dissipated from the heat dissipating elements so as to cool the LED's when a stream of air passes through the passage;
   (b) positioning the apparatus within the liner and moving the apparatus through the liner while (i) irradiating electromagnetic radiation of the specific wavelength or in the specific wavelength range from the LED's onto the liner for curing the resin and (ii) passing a stream of air through the passage to dissipate heat from the heat dissipating elements; and (c) adjusting the velocity of movement of the apparatus through the liner so as to cause a complete curing of the resin.

2. The method according to claim 1, further comprising:

(d) detecting the temperature of the liner;

wherein the step of adjusting the velocity of movement of the apparatus is performed by monitoring a detected temperature profile within the liner and adjusting the velocity of movement of the apparatus so as to detect a temperature profile having a maximum temperature at a trailing end of the apparatus.

3. The method according to claim 2, wherein the step of detecting the temperature of the liner is performed by an IR detector operatively associated with the apparatus and configured to detect the temperature of an adjacent liner surface.

4. The method according to claim 2, wherein the apparatus is a first apparatus, and wherein the step of providing an apparatus comprises:

providing a second apparatus substantially identical to the first apparatus; and connecting the first end of the housing of the second apparatus to the second end of the housing of the first apparatus.

5. The method according to claim 4, wherein the connecting step is performed by providing a cardanic joint between the first end of the housing of the second apparatus and the second end of the housing of the first apparatus.

6. The method according to claim 4, wherein the connecting step is performed by providing a ball-and-socket joint between the first end of the housing of the second apparatus and the second end of the housing of the first apparatus.

* * * * *